United States Patent
Beznosov et al.

(10) Patent No.: US 7,260,831 B1
(45) Date of Patent: Aug. 21, 2007

(54) METHOD AND SYSTEM FOR AUTHORIZATION AND ACCESS TO PROTECTED RESOURCES

(75) Inventors: Konstantin Beznosov, Pittsburgh, PA (US); Jennifer Carter, Irving, TX (US); James Mwaura, Dallas, TX (US); Hieu Nguyen, Colleyville, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 788 days.

(21) Appl. No.: 10/132,838

(22) Filed: Apr. 25, 2002

(51) Int. Cl.
*G06F 7/04* (2006.01)
*G06F 17/30* (2006.01)
*G06K 9/00* (2006.01)
*H04L 9/32* (2006.01)

(52) U.S. Cl. ....................................................... 726/2

(58) Field of Classification Search ................ 709/203, 709/237; 726/1, 2
See application file for complete search history.

(56) References Cited

U.S. PATENT DOCUMENTS 6,615,253 B1 * 9/2003 Bowman-Amuah ......... 709/219
2001/0021928 A1 * 9/2001 Ludwig et al. ............... 705/67
2002/0083192 A1 * 6/2002 Alisuag ....................... 709/237
2003/0028798 A1 * 2/2003 Burnett ....................... 713/200

OTHER PUBLICATIONS

Beznosov, Deng, Lakely, Burt, Barkely; A resource access decision service for CORBA-based distributed sysrtems, Computer Security Applications Conference, 1999 (ASAC99') Proceedings.*

* cited by examiner

*Primary Examiner*—Gilberto Barron, Jr.
*Assistant Examiner*—F. Homayounmehr

(57) ABSTRACT

The present disclosure addresses an enhancement to a resource access decision facility, preferably a CORBA RAD, that allows additional query capabilities and faster resource access. Resource access decisions obtained from RAD are placed in a cache. An application can retrieve access decisions directly from the cache rather than requesting the decisions from RAD. If an access decision is not available in the cache, the access decision is requested from RAD. The preferred embodiments of the present disclosure allow the retrieval of lists of roles that have access to a particular resource and resources to which a particular role has access. The cache can be populated either prior to or during the mainstream execution of a program. In another embodiment, a backup version of the data in the cache can be stored in a storage medium external to the cache for near immediate restart after a crash or shutdown.

21 Claims, 7 Drawing Sheets multiple_access_allowed(role1,resourceA,role2,resourceA,role3,resourceA,role4,resourceA,role5,resourceA,role6,resourceA)

Figure 3a

(yes,yes,no,no,no,yes)

Figure 3b

(yes,yes,no,no,no,yes)
(yes,yes,yes) → (role1,role2,role6)

Figure 3c

|  | resourceA | resourceB | resourceC |
|---|---|---|---|
| role1 | Y | N | Y |
| role2 | Y | N | N |
| role3 | N | Y | Y |

Figure 4

METHOD AND SYSTEM FOR AUTHORIZATION AND ACCESS TO PROTECTED RESOURCES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the access of data resources using a Resource Access Decision Facility (RAD), preferably a CORBA RAD. More particularly, embodiments of the present invention provide enhancements to a RAD that allow additional query capabilities and faster resource access.

BACKGROUND OF THE INVENTION

Computer networks transmit data between the individual components in the network along multiple communication channels. One type of a distributed object system which participates in computer networks is a distributed object system that is defined under the Common Object Request Broker Architecture (CORBA) specification produced by OMG. Distributed object systems may be in the context of an Object Request Broker (ORB) implemented under the CORBA specification from the OMG, Revision 2.0, Revision 2.1, Revision 2.2 and Revision 2.3, all of which are incorporated herein by reference in their entirety. For purposes of this application, programs and communications compliant with CORBA Revision 2.3, 2.2, and 2.1, by definition will be viewed as compliant with CORBA Revision 2.0 and will be referred to simply as CORBA-compliant. Unless otherwise specified, a generic reference to the CORBA Services specification will be presumed to be OMG's CORBA Services Revision 2.0.

The CORBA Resource Access Decision (RAD) Facility is intended to be used by security-aware applications. The facility is a mechanism for obtaining authorization decisions and administering access decision policies. It enables a common way for an application to request and receive an authorization. The CORBA RAD facility is described in the OMG document Resource Access Decision Facility Specification, Version 1.0, which is incorporated herein by reference in its entirety. References herein to requests to or actions taken by CORBA RAD should be understood as referring to a facility complying with the CORBA RAD specifications. Further, while the present disclosure focuses on its preferred embodiment enhancing CORBA RAD, one of skill in the art will recognize that many of the same benefits may be obtained with other types and versions of resource access decision facilities which provide authorization for access to protected resources.

Applications that access sensitive resources can use CORBA RAD to validate a user's authority to retrieve those resources. The service provides administrative tools to establish security policy that defines authorized access to resources. Prior to making calls to the authorization service the user whose authority is being validated must be authenticated. Once authenticated, the user's credentials can be established based on the user's security attributes. User security attributes (userid, organization, roles, groups, domain, and the like) can be stored in a user profile facility and administered via a profile manager interface. Applications can make explicit calls to CORBA RAD, typically using resource, operation, and user credentials as arguments, to determine if a user is authorized to access secured resources. CORBA RAD then returns a Boolean access decision.

Standard CORBA RAD security policy consists of user policy and access policy definitions. User policy comprises a user's security attributes including userid, organization, assigned groups, and roles. These attributes define a user's credentials or granted rights in the system. Access policy comprises resources, resource domains, operations, operation criteria, and access rules that define the required rights and criteria constraints to perform operations on resources. Access decisions are evaluated by comparing the granted rights of a user attempting to access a resource with the rights required to access the resource as defined by the security policy.

The policy contains mechanisms to group users and resources to enable scalable administration. Users can be placed in defined organizational entities or groups of associated users. Resources can be grouped into domains so that policy can be defined at the domain level for a set of resources sharing common policy.

Three types of policy rules are defined in the CORBA RAD access policy: permissive, constraint, and override. Permissive rules define access requirements sufficient to permit access unless additional access requirements are defined by constraint or override rules. Permissive rules are the default rule type. If multiple permissive rules are specified they are evaluated via a logical "or" operator. That is, if any of the permissive policies evaluate "true" then the user is permitted access unless further constrained by constraint or override rules.

If constraint rules are specified, this indicates that there is an access requirement that must be met in addition to those specified by the permissive rules. If multiple constraint rules are specified they are evaluated via a logical "or" operator to determine if the constraint condition is met. That is, if any of the constraint rules evaluate "true" then the additional access requirement is satisfied. A logical "and" operator is used to combine the evaluated constraint and permissive rules. That is, one of the constraint rules must be met and one of the permissive rules must allow access. If no permissive rules exist, the access decision evaluates "false".

If override rules are specified for resources, these invalidate any permissive or constraint rules that would otherwise permit access. This provides a mechanism to define exceptions to general policy definitions. If multiple override rules are specified they are evaluated via a logical "and" operator. That is, all of the override rules must evaluate "true" for access to be permitted. Any permissive or restraint rules that would otherwise apply are ignored.

In the design of a CORBA RAD-compliant application, authorization logic is encapsulated within an authorization facility that is external to the application. In order to perform an application-level access control, an application requests an authorization decision from such a facility and enforces that decision. The following sequence occurs in the interaction between a client using CORBA RAD and the external authorization facility. First, the application client invokes an operation of the interface provided by a target object. The CORBA object request broker transfers this request to the target object and causes invocation of the appropriate method in the target object. While processing the request, the target object requests an authorization decision from the Access Decision object (ADO) by invoking the access_allowed( ) method of the ADO.

Then, the Access Decision object consults other objects that are internal to the RAD to make an access decision. The access decision is returned to the target object (ADO client) as a Boolean response. The target object, after receiving an authorization decision, is responsible for enforcing the decision. If access was granted by the ADO, the target object performs the requested operation and returns the results. If access to secured resources was denied, the target object may return partial results or raise an exception to the client.

Standard CORBA RAD as specified by OMG contains no single command that retrieves a list of all resources available to a particular user. Similarly, there is no command to retrieve a list of all users who have access to a particular resource. In addition, calling CORBA RAD for every resource request can be time-consuming, especially when multiple, repetitive requests for the same resource are made. It would be desirable to have a cache or similar memory retention mechanism in which authorization decisions received from CORBA RAD can be retained so that subsequent requests for the same authorization decision can be made directly to the cache rather than through CORBA RAD.

SUMMARY OF THE INVENTION

A general embodiment of the present disclosure provides a method for authorizing access requested by an application to a resource protected by a resource access decision facility. In a preferred embodiment, the application uses an authorization interface to send a request for access comprising the resource requested and at least one piece of identifying information about the requestor. The authorization interface queries a cache populated with access results generated by the resource access decision facility for a response to the authorization request. In various specific alternative embodiments, the cache may be populated in an initialization phase for a given application, during the initialization phase for the resource access decision facility, or dynamically populated during mainstream operation of the resource access decision facility. If the query response from the cache is true then the authorization interface passes back the true response and the application accesses the resource on behalf of the requester. If the query response from the cache is false then the authorization interface passes back the false response and access is denied. If the cache does not contain a response for the identified requester and resource, then the authorization interface sends the query directly to the resource access decision facility for a response to the authorization request. If the query response from the resource access decision facility is true then the authorization interface passes back the true response and the application accesses the resource on behalf of the requester. If the query response from the resource access decision facility is not true then access is denied.

In its preferred embodiment, the resource access decision facility is a CORBA resource access decision facility. In its preferred embodiment, the authorization interface evaluates whether the request for access is a permissive request or whether the request for access comprises the use of restraints or overrides. If the request is a permissive request, then the authorization interface querying a cache populated with permissive access results generated by the resource access decision facility for a response to the authorization request. If the cache does not contain a response for the identified requester and resource, then the authorization interface sends the query directly to the resource access decision facility for a response to the authorization request. In a preferred embodiment, this may also occur without first querying the cache if the request for access comprises the use of restraints or overrides.

In specific embodiments of the general method described, the piece of identifying information may include the role of the requester, the domain of the requester, and/or the userid of the requestor. Any of these pieces of information may also be referred to as the identifier of the requester. In the most preferred embodiment, the application may additionally use the authorization interface to send a request for a list of all identifiers with access to a specified resource. The authorization interface obtains the requested list directly from the cache through the invocation of a single method. Similarly, the application may additionally use the authorization interface to send a request for a list of all resources for which a specified identifier has access. The authorization interface obtains the requested list directly from the cache through the invocation of a single method. The identifier used could be the role, the userid, or other similar identifying information.

The preferred embodiment of the present disclosure provides a method for enhancing the capabilities of a CORBA Resource Access Decision Facility. This method involves populating a cache with resource access decisions obtained from the CORBA Resource Access Decision Facility. In specific alternative embodiments, the cache may be populated prior to the mainstream execution of a computer program that uses the cache or during the mainstream execution of a computer program that uses the cache. A single cache may be used which is accessed by more than one computer program. In an alternative embodiment, a copy of the data in the cache is stored in a storage medium separate from the cache.

In this preferred embodiment, the next action after populating the cache involves retrieving an access decision from the cache when the access decision is present in the cache. When the access decision is not present in the cache, the method includes requesting an access decision from the CORBA Resource Access Decision Facility. In the more preferred embodiments the method further includes retrieving from the cache, through the invocation of a single method, a list of roles that have access to a specified resource and/or retrieving from the cache, through the invocation of a single method, a list of resources to which a specified role has access.

From a different structural viewpoint, a preferred embodiment of the present disclosure provides a computer program for enhancing the capabilities of the CORBA Resource Access Decision Facility. The computer program includes computer code that populates a cache with resource access decisions obtained from the CORBA Resource Access Decision Facility. It also includes computer code that retrieves an access decision from the cache when the access decision is present in the cache, and computer code that requests an access decision from the CORBA Resource Access Decision Facility when the access decision is not present in the cache. Again, in the more preferred embodiments, the program further includes computer code that retrieves from the cache, through the invocation of a single method, a list of roles that have access to a specified resource and/or computer code that retrieves from the cache, through the invocation of a single method, a list of resources to which a specified role has access.

Finally, from a third structural viewpoint, a preferred embodiment of the present disclosure provides a computer system. The computer system includes a cache populated with resource access decisions obtained from the CORBA Resource Access Decision Facility. The computer system also includes computer code that retrieves an access decision from the cache when the access decision is present in the cache and requests an access decision from the CORBA Resource Access Decision Facility when the access decision is not present in the cache. In more preferred embodiments, the computer system may further include commuter code that retrieves from the cache, through the invocation of a single method, a list of roles that have access to a specified resource and/or computer code that retrieves from the cache, through the invocation of a single method, a list of resources to which a specified role has access. In the most preferred embodiment, the computer system further includes computer code that evaluates whether an access decision is a permissive access decision or whether the access decision comprises constraints or overrides. In such a system the computer code retrieving from the cache includes computer code that retrieves a permissive access decision from the cache and requests a permissive access decision from the CORBA Resource Access Decision Facility when the permissive access decision is not present in the cache. In such a system, there may additionally be computer code that requests an access decision which comprises restraints or overrides from the CORBA Resource Access Decision Facility without first checking the cache.

BRIEF DESCRIPTION OF THE DRAWINGS

FIG. 3 is a diagram depicting a use of the multiple_access_allowed( ) method;

FIG. 4 is a diagram depicting a Static Cache matrix;

DETAILED DESCRIPTION OF THE PREFERRED EMBODIMENTS

The present disclosure addresses a method for providing querying capabilities not available with the standard CORBA RAD and for increasing the speed of access to resources controlled by CORBA RAD. It provides an enhancement to the standard CORBA RAD without modifying its specification or implementation. One structural feature employed to help with this enhancement is the addition of a static cache to be used in conjunction with a resource access decision facility. While the present disclosure provides a method and structure to do this while still providing CORBA-compliant RAD services, this extension is not one suggested by the CORBA specification and may also be more generally applicable to resource access decision facilities providing similar functions even if not specifically designed to meet the CORBA specification.

Figure 1:
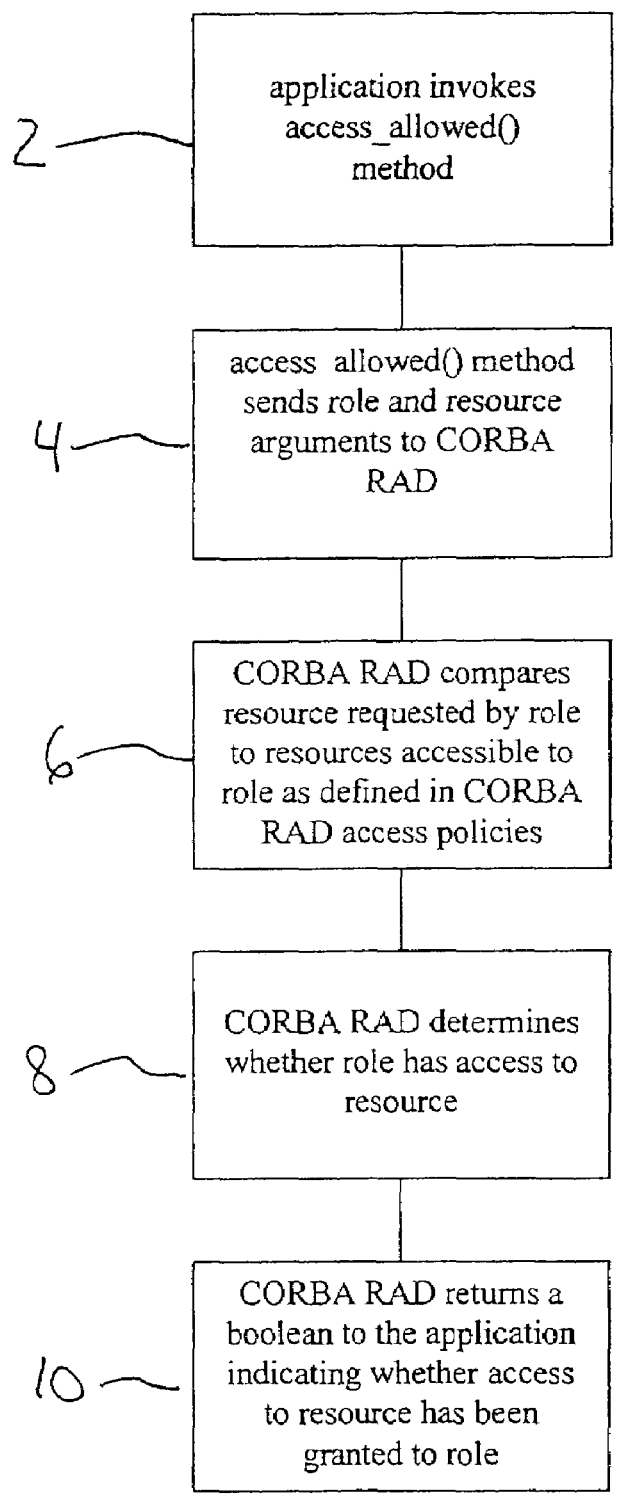
FIG. 1 is a flowchart depicting the access_allowed( ) method under CORBA RAD.

Standard CORBA RAD has an AccessDecision interface with two methods: access_allowed( ) and multiple_access_allowed( ). Both methods take parameters that can be referred to as "role" and "resource" as arguments that are passed to the CORBA RAD decision-making mechanism. "Role" refers to the entire set of a user's security attributes including userid, group, and security credentials. Individually, these and similar attributes may also be referred to as "Identifiers," and (although not in the most preferred method) any one or combination of the identifiers may be used in place of the set of attributes defined by the system as the role. The use of such an identifier or set of identifiers is still to be understood as supplying the role of the requesting user. When access_allowed( ) is invoked, a single role and single resource are passed to CORBA RAD and CORBA RAD is asked to provide a decision whether the role is allowed access to the resource. A single Boolean response is returned. This process is illustrated in FIG. 1. In box 2, an application invokes the access_allowed( ) method. In box 4, the access_allowed( ) method sends the role and resource arguments to CORBA RAD. In box 6, CORBA RAD compares the resource requested by the role to the resources accessible to the role as defined in the CORBA RAD access policies. In box 8, CORBA RAD determines whether the role has access to the requested resource. In box 10, CORBA RAD returns a Boolean variable that indicates whether access to the resource has been granted to the role.

Figure 2:
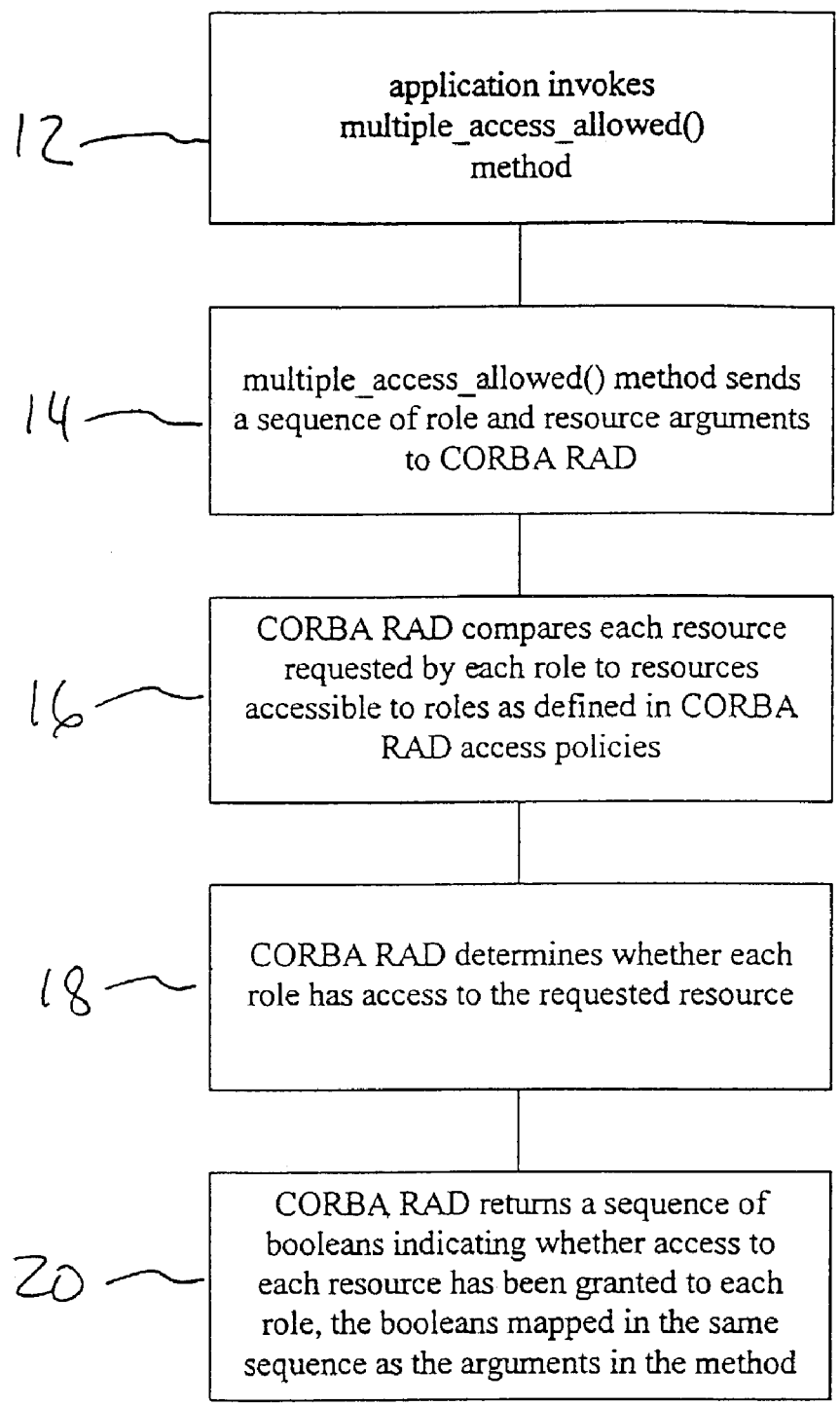
FIG. 2 is a flowchart depicting the multiple_access_allowed( ) method under CORBA RAD.

When multiple_access_allowed( ) is invoked, a sequence of roles and resources is passed to CORBA RAD and an access decision is requested for each role/resource set. The return is a sequence of Boolean responses that maps in the same order as the request. This process is illustrated in FIG. 2. In box 12, an application invokes the multiple_access_allowed( ) method. In box 14, the multiple_access_allowed ( ) method sends a sequence of role and resource arguments to CORBA RAD. In box 16, CORBA RAD compares each resource requested by each role to the resources accessible to the roles as defined in the CORBA RAD access policies. In box 18, CORBA RAD determines whether each role has access to the requested resource. In box 20, CORBA RAD returns a sequence of Boolean responses that indicate whether access to each resource has been granted to the roles. The Boolean responses are mapped in the same sequence as the arguments in the method.

Standard CORBA RAD does not provide a method that can return a list of all roles that have access to a particular resource or all resources to which a particular role has access. The multiple_access_allowed( ) method could be used to assemble such a list but the assembly would require that additional programming logic be inserted into an application using the multiple_access_allowed( ) method. For example, if an application needed a list showing which roles out of a list of six roles had access to a particular resource, a method call similar to that in FIG. 3a could be made to CORBA RAD. Here, the multiple_access_allowed( ) method can be seen to have role1, resourceA, role2, resourceA, role3, resourceA, role4, resourceA, role5, resourceA, role6, and resourceA as arguments. The return would look similar to FIG. 3b where "yes, yes, no, no, no, yes" indicates that role1 has access to resourceA, role2 has access to resourceA, role3 does not have access to resourceA, role4 does not have access to resourceA, role5 does not have access to resourceA, and role6 has access to resourceA. The application receiving this return would require logic that could extract the "yes" answers from the return to create the desired list. This process is illustrated in FIG. 3c where the "yes, yes, no, no, no, yes" response is transformed into a list indicating that role1, role2, and role6 have access to resourceA. The invocation of methods with large numbers of arguments and the extraction of the desired answers from a large sequence of Boolean responses can be cumbersome and time-consuming.

An application using the present disclosure can request a list such as those described above directly from a cache and avoid the extra step of assembling the list from a response returned from CORBA RAD. In an embodiment of the invention, an application prepopulates the cache before beginning mainstream execution. Prepopulation comprises requesting access decisions from CORBA RAD for all role/resource combinations for which it is anticipated an access decision will be requested during execution of the application. The access decisions are placed in a matrix with A rows and B columns, where A is the number of roles and B is the number of resources. A Boolean response is placed at each intersection of a row and a column indicating whether the role on that row has access to the resource on that column. This is illustrated in FIG. 4 where three roles, role1, role2, and role3, and three resources, resourceA, resourceB, and resourceC are shown in a matrix. The "Y" and "N" elements in the matrix represent Boolean responses indicating whether a particular role has access to a particular resource. For example, the "Y" at the intersection of role1 and resourceA indicates that role1 does have access to resourceA. The "N" at the intersection of role2 and resourceC indicates that role2 does not have access to resourceC.

After the cache has been populated, the application can send access decision requests directly to the cache rather than to CORBA RAD, thus decreasing the time needed for an access decision. However, the size of the cache tends to be limited and it is possible that every resource access decision needed by the application cannot be loaded into the cache. The authorization interface for the present disclosure contains the same access_allowed( ) and multiple_access_ allowed( ) methods used in the standard CORBA RAD interface. When an application using the present disclosure needs an access decision it simply invokes one of these methods in the same manner as an application using standard CORBA RAD. These methods send access decision requests to the cache and then, if the requested decision is not available in the cache, the authorization interface passes the request on to CORBA RAD. CORBA RAD then processes the request in its usual manner and returns a decision to the authorization interface and hence to the application. Thus, the cache is transparent to the application; that is, the application can invoke access_allowed( ) or multiple_ access_allowed( ) and is not aware of whether an access decision has come from the cache or from CORBA RAD.

The cache is most preferably kept in active memory on the server supporting the RAD facility, but could also be kept in a flat file in another storage means. The cache could also be located on a different server but in the same domain as the RAD facility, or in more unusual cases with very high traffic from a single application, the cache could be located on the same server as the application. Accessing data from a cache is generally faster than accessing data from other storage mechanisms. By retrieving resource access decisions from a cache rather than processing requests through the RAD facility, applications can typically decrease their execution time. This is particularly true when the same access decision requests are made multiple times. However, the prepopulation of the cache can consume a considerable amount of execution time when the cache is large. When the number of access decision requests to be made is small, the time spent populating the cache can exceed the time saved by using the cache. The application programmer must determine whether the sum of the individual time savings achieved by calling cache rather than the RAD exceeds the time required to populate the cache.

Figure 5:
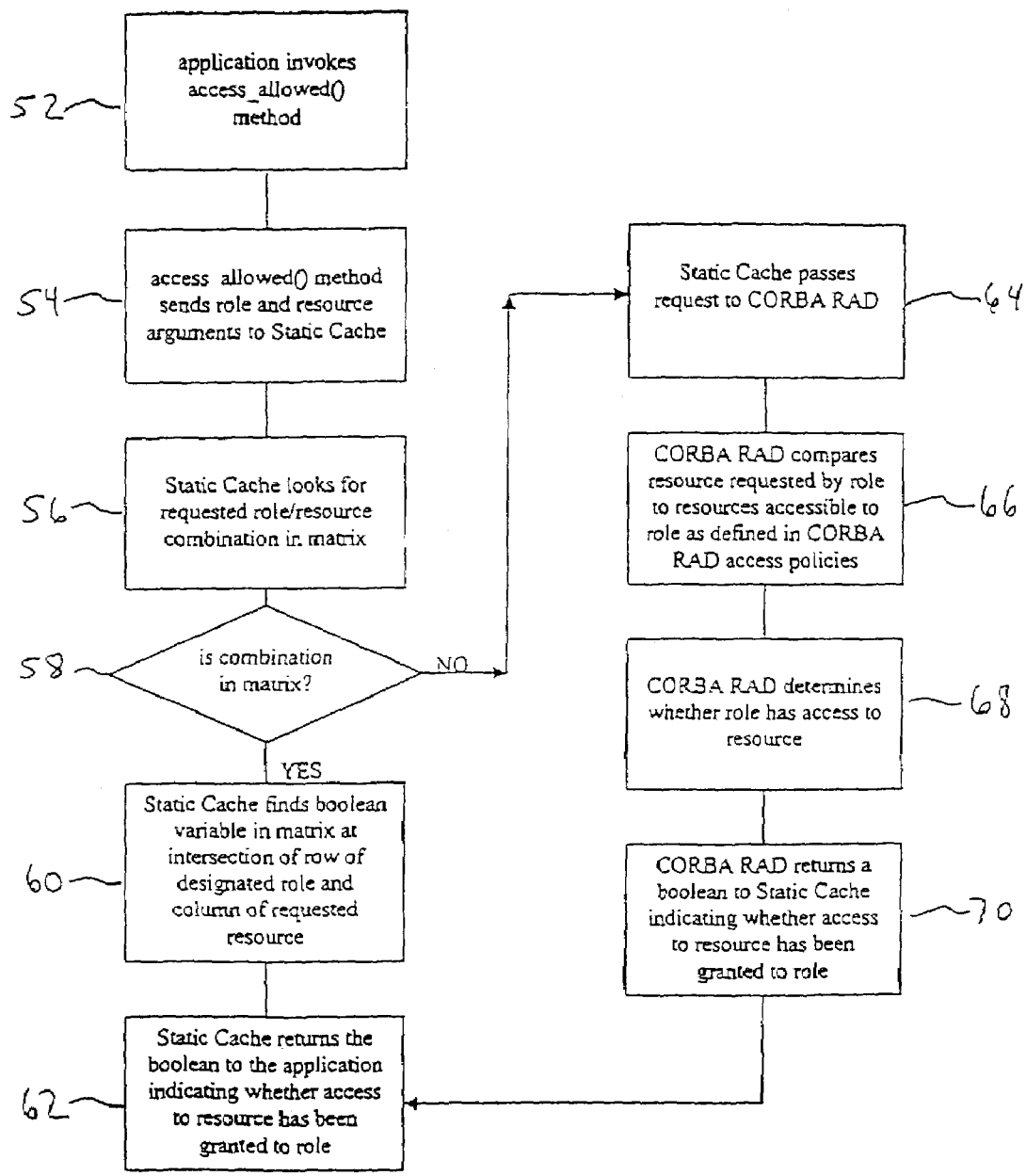
FIG. 5 is a flowchart depicting the access_allowed( ) method under Static Cache.
Figure 6:
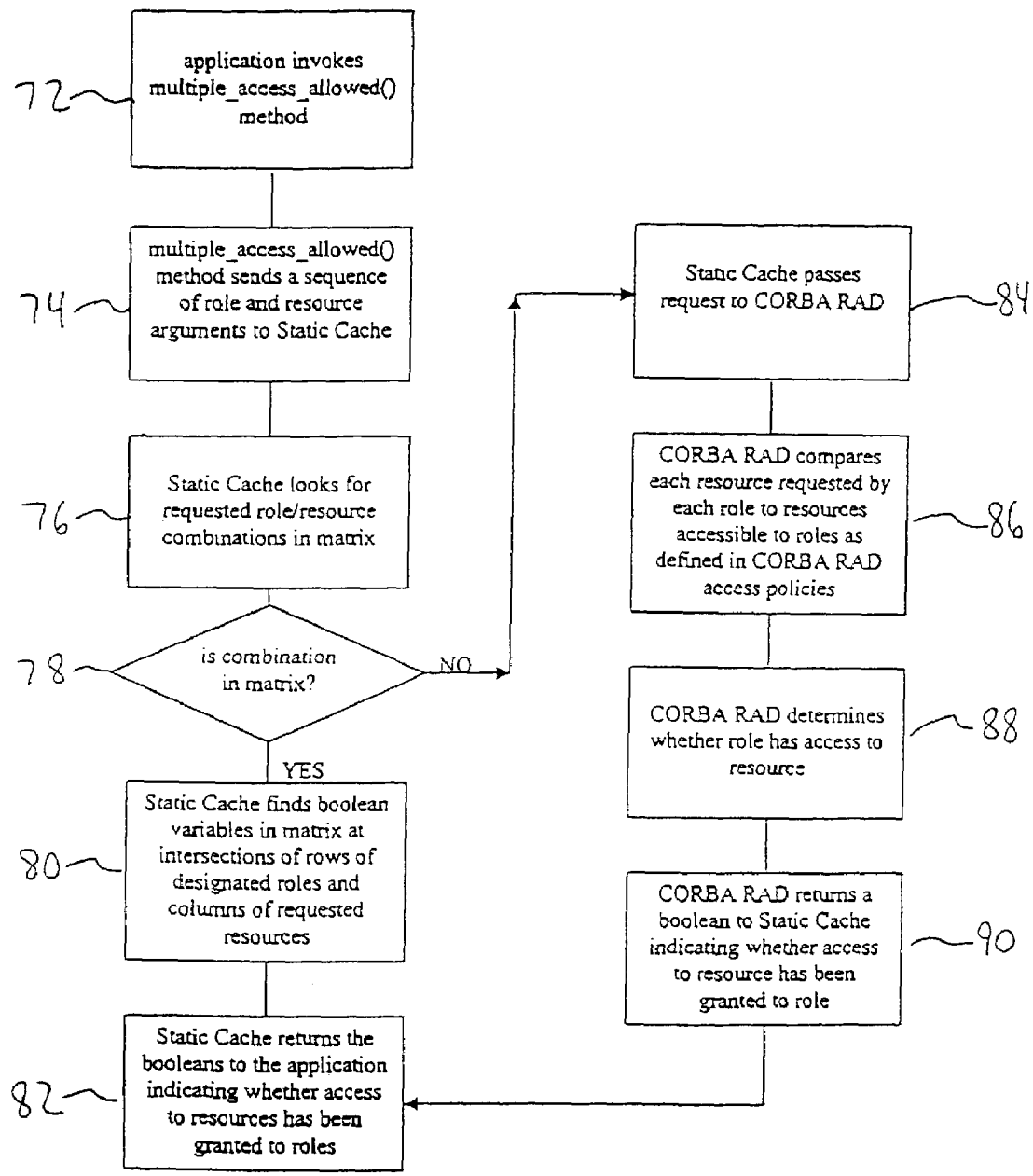
FIG. 6 is a flowchart depicting the multiple_access_allowed( ) method under Static Cache.

The access_allowed( ) and multiple_access_allowed( ) methods as used with a cache are depicted in FIGS. 5 and 6. In box 52 of FIG. 5, an application invokes the access_allowed( ) method. In box 54, the access_allowed( ) method sends the role and resource arguments to the cache. In box 56, the cache looks for the requested role/resource combination in the cache matrix. In box 58, a decision is made based on whether the requested combination is in the matrix. If the requested combination is in the matrix, box 60 is executed in which the cache finds the Boolean response at the intersection of the row of the designated role and the column of the requested resource. Box 62 is then executed in which the cache returns the Boolean response indicating whether access to the resource has been granted to the role. If, in box 58, it is determined that the requested role/resource combination is not in the matrix, box 64 is executed. In box 64, the Static Cache passes the access decision request on to the RAD. Although this response is illustrated here as coming from the cache itself, in the most preferred embodiment, the authorization interface manages the transfer of the request to the RAD. In the text of the Figures, the capitalized Static Cache typically refers to the disclosed elements between the application and the RAD. This includes the authorization interface and the cache grouping them collectively as the "Static Cache." In box 66, the RAD compares the resource requested by the role to the resources accessible to the role as defined in the RAD access policies. In box 68, the RAD determines whether the role has access to the requested resource. In box 70, the RAD returns to the cache a Boolean response that indicates whether access to the resource has been granted to the role. Box 62 is then executed as above. Again, the disclosure discusses the "Static Cache" handling the return of the RAD decision, while the most preferred embodiment uses the authorization interface to manage this transfer.

FIG. 6 illustrates the multiple_access_allowed( ) method as used by an embodiment of the present disclosure. In box 72, an application invokes the multiple_access_allowed( ) method. In box 74, the multiple_access_allowed( ) method sends a sequence of role and resource arguments to the cache. In box 76, the cache looks for the requested role/ resource combinations in the cache matrix. In box 78, a decision is made based on whether the requested combinations are in the matrix. If a requested combination is in the matrix, box 80 is executed in which the cache finds the Boolean response at the intersection of the row of the designated role and the column of the requested resource. Box 82 is then executed in which the cache returns the Boolean response indicating whether access to the resource has been granted to the role. If, in box 78, it is determined that a requested role/resource combination is not in the matrix, box 84 is executed. In box 84, the "Static Cache" (in this case the authorization interface component of the Static Cache) passes the access decision request on to the RAD. In box 86, the RAD compares the resource requested by the role to the resources accessible to the role as defined in the RAD access policies. In box 88, the RAD determines whether the role has access to the requested resource. In box 90, the RAD returns to "Static Cache" a Boolean response that indicates whether access to the resource has been granted to the role. Box 82 is then executed as above.

In addition to the access_allowed( ) and multiple_access_allowed( ) methods, the Static Cache interface (also referred to as the authorization interface as discussed above) contains methods that return lists of roles or resources. The getPermissionsByAttribute( ) method examines the contents of the cache and returns a list of resources that are accessible to a role. The getAttributesByPermission( ) method returns a list of roles that have access to a particular resource. Once the cache has been populated, an application can invoke one of these methods and the requested list is simply read from the appropriate row or column of the cache matrix. Referring to FIG. 4, if the getPermissionsByAttribute( ) method is invoked with role1 as an argument, the cache would return a list with resourceA and resourceC as members since those are the resources on the role1 row with "Y" elements. Similarly, if the getAttributesByPermission( ) method is invoked with resourceA as an argument, the cache would return a list with role1 and role2 as members since those are the roles on the resourceA column with "Y" elements. These methods provide functionality that is not directly available in standard CORBA RAD. As described above, additional programming logic would need to be added to an application using standard CORBA RAD to obtain the same functionality provided by these methods.

In the current embodiment of the invention, the cache can be populated only with access decisions that were obtained through permissive rules. The results of resource access decision requests that contain constraints or overrides cannot be stored in the cache; such requests must be made to the standard RAD. Applications that use the "Static Cache" know that only access decisions without constraints or overrides can be cached and, during prepopulation of the cache, request only those access decisions that use permissive-only rules.

In an alternative embodiment of the invention, the cache is not prepopulated before mainstream execution of the application begins. Instead, population of the cache occurs dynamically throughout the execution of the application. In this embodiment, whenever the application asks a permissive-only question, that is, whenever a resource access decision without constraints or overrides is requested, the Boolean response is stored in the cache. In this manner, the cache is populated one decision at a time throughout the run time of the application. The cache is able to recognize that a request is permissive-only because the method used to make such a request has a different signature than a method with constraints or overrides. The next time an access decision is requested that was requested earlier in the execution of the application, the response can come from the cache rather than from CORBA RAD. Since access to the cache is faster than access to CORBA RAD, the execution time of the application is decreased.

Each instance of the RAD facility typically populates and uses its own cache which can be shared by multiple applications accessing the RAD facility. When similar access decisions are likely to be requested by several applications, it may be more efficient to prepopulate one large cache to be used by all of the applications rather than individually prepopulate multiple smaller caches. While there may be some inefficiency in this technique in that any one application is unlikely to use every access decision in the cache, this inefficiency can be overcome by the fact that prepopulation of the cache is done only once. For example, if individual prepopulation takes one second for each of ten applications, the total prepopulation time for all applications would be ten seconds. On the other hand, if prepopulation of one larger cache that can be used by all ten applications takes two seconds but is done only once, a significant savings of time can be achieved. Alternatively, in a less preferred embodiment, individual applications may have their own cache, particularly where the applications have a very high projected usage and a relatively unique set of parameters or a relatively narrow bandwidth between the application and the resource access decision facility.

Administrative changes can occur regarding which roles have access to which resources. For example, a user may be granted access to resources that were formerly inaccessible or a user's employment may be terminated and all access must be revoked. The cache must be updated or refreshed when such changes take place. With both prepopulation and dynamic population of the cache, a refresh of the cache data can occur. Under either scenario an administrator would typically make the necessary changes to the access policies within CORBA RAD. With the prepopulation technique, the application using the cache would be notified of the change and would typically re-run the prepopulation routine to place the new data in the cache. With the dynamic population technique, the application, after being notified of the change, would typically erase all contents from the cache and then reload the cache one matrix element at a time as it continued execution.

In another embodiment of the invention, a backup version of the data in the cache can be stored in a storage medium external to the cache itself, such as a local file system. If an application ceases execution unexpectedly, the cache can be repopulated from the backup rather than being rebuilt from scratch through the prepopulation or dynamic population process.

Figure 7:
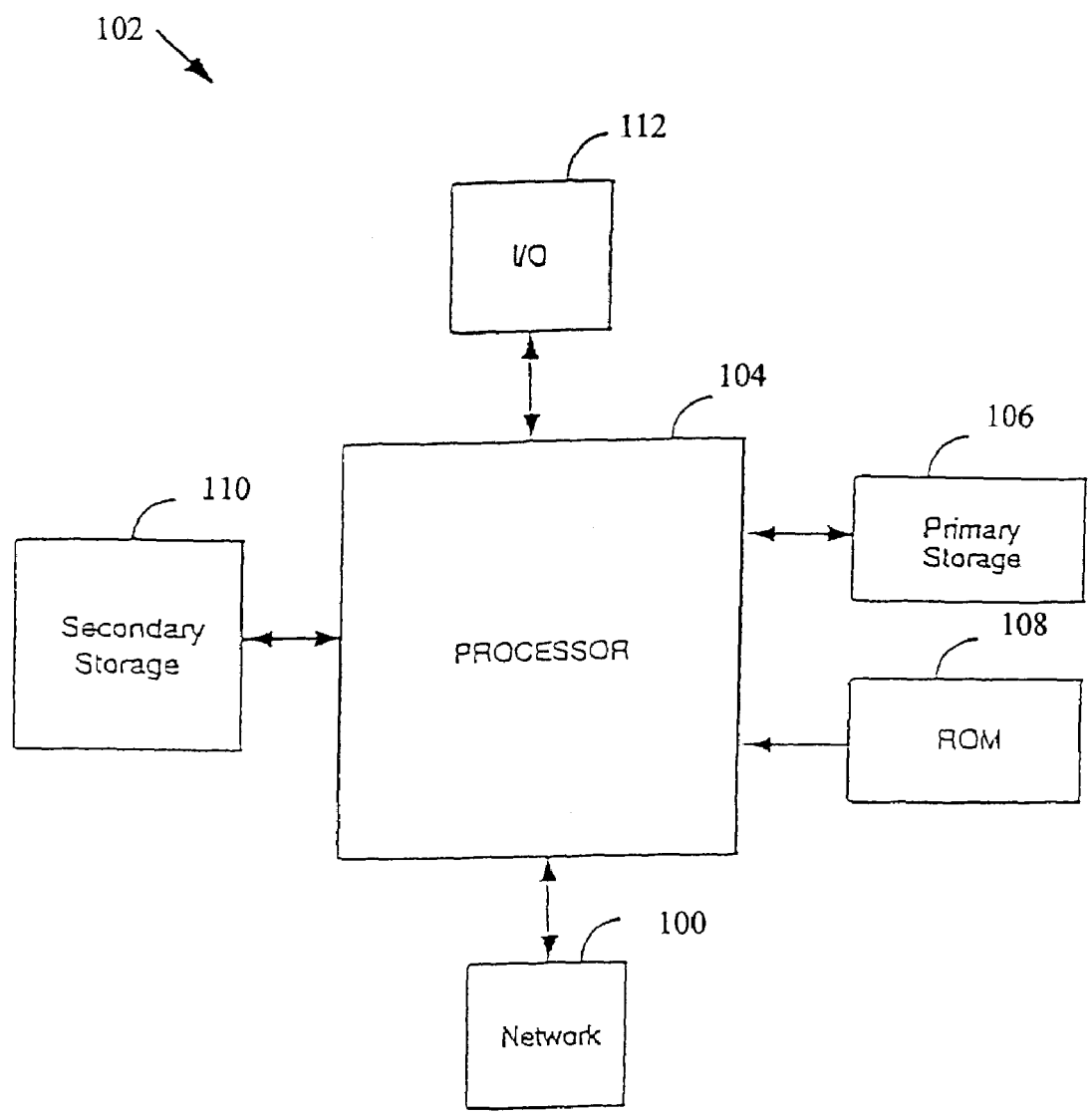
FIG. 7 is a diagram of a typical, general-purpose computer system suitable for implementing the present invention.

A method and system for authorization and access to protected resources as described above may generally be implemented on a variety of different computer systems. FIG. 7 illustrates a typical, general-purpose computer system suitable for implementing the present invention. The computer system 102 includes a processor 104 (also referred to as a central processing units, or CPU) that is coupled to memory devices including primary storage devices 108 (typically a read only memory, or ROM) and primary storage devices 106 (typically a random access memory, or RAM).

As is well known in the art, ROM acts to transfer data and instructions uni-directionally to CPU 104, while RAM is used typically to transfer data and instructions in a bi-directional manner. Both storage devices 106, 108 may include any suitable computer-readable media. A secondary storage medium 110, which is typically a mass memory device, is also coupled bi-directionally to CPU 104 and provides additional data storage capacity. The mass memory device 110 is a computer-readable medium that may be used to store programs including computer code, data, and the like. Typically, mass memory device 110 is a storage medium such as a non-volatile memory such as a hard disk or a tape which generally slower than primary storage devices 106, 108. Mass memory storage device 110 may take the form of a magnetic or paper tape reader or some other well-known device. It will be appreciated that the information retained within the mass memory device 110, may, in appropriate cases, be incorporated in standard fashion as part of RAM 108 as virtual memory. A specific primary storage device 106 such as a CD-ROM may also pass data uni-directionally to the CPU 104.

CPU 104 are also coupled to one or more input/output devices 112 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 104 optionally may be coupled to a computer or telecommunications network, e.g., an internet network, or an intranet network, using a network connection as shown generally at 100. With such a network connection, it is contemplated that CPU 104 might receive information from the network, or might output information to the network in the course of performing the above-described method steps. Such information, which is often represented as a sequence of instructions to be executed using CPU 104, may be received from and outputted to the network, for example, in the form of a computer data signal embodied in a carrier wave. The above-described devices and materials will be familiar to those of skill in the computer hardware and software arts.

In one embodiment, sequences of instructions may be executed substantially simultaneously on multiple CPUs, as for example a CPU in communication across network connections. Specifically, the above-described method steps may be performed across a computer network. Additionally, it will be recognized by one of skill in the art that the above monitor programs and integrated monitoring system may be recognized as sets of computer codes and that such computer codes are typically stored in computer readable mediums such as RAM, ROM, hard discs, floppy discs, or carrier waves and the like.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

What is claimed is:

1. A method for enhancing the capabilities of a CORBA Resource Access Decision Facility comprising:
    populating a cache only with permissive resource access decisions obtained from the CORBA Resource Access Decision Facility;
    when a permissive resource access decision is present in the cache, retrieving the permissive access decision from the cache and not requesting an access decision from the CORBA Resource Access Decision Facility; and
    requesting a permissive resource access decision from the CORBA Resource Access Decision Facility only when the access decision is not present in the cache;
    wherein the action of requesting an access decision from the CORBA Resource Access Decision Facility comprises:
        requesting a permissive access decision from the CORBA Resource Access Decision Facility only when the permissive access decision is not present in the cache; and
        requesting an access decision which comprises restraints or overrides from the CORBA Resource Access Decision Facility without first checking the cache.

2. The method of claim 1 further comprising retrieving from the cache, through the invocation of a single method, a list of roles that have access to a specified resource.

3. The method of claim 1 further comprising retrieving from the cache, through the invocation of a single method, a list of resources to which a specified role has access.

4. The method of claim 1 wherein the cache is populated prior to the mainstream execution of a computer program that uses the cache.

5. The method of claim 1 wherein the cache is populated during the mainstream execution of a computer program that uses the cache.

6. The method of claim 1 wherein a single cache is accessed by more than one computer program.

7. The method of claim 1 wherein a copy of the data in the cache is stored in a storage medium separate from the cache.

8. A computer program for enhancing the capabilities of the CORBA Resource Access Decision Facility comprising:
    computer code that populates a cache only with permissive resource access decisions obtained from the CORBA Resource Access Decision Facility;
    when a permissive access decision is present in the cache, computer code that retrieves the access decision from the cache without and does not request an access decision from the CORBA Resource Access Decision Facility;
    computer code that requests a permissive resource access decision from the CORBA Resource Access Decision Facility only when the access decision is not present in the cache; and
    wherein the computer code that requests an access decision from the CORBA Resource Access Decision Facility comprises:
        computer code that requests a permissive access decision from the CORBA Resource Access Decision Facility only when the permissive access decision is not present in the cache; and
        computer code that request an access decision which comprises restraints or overrides from the CORBA Resource Access Decision Facility without first checking the cache.

9. The computer program of claim 8 further comprising computer code that retrieves from the cache, through the invocation of a single method, a list of roles that have access to a specified resource.

10. The computer program of claim 8 further comprising computer code that retrieves from the cache, through the invocation of a single method, a list of resources to which a specified role has access.

11. The computer program of claim 8 further comprising computer code that populates the cache prior to the mainstream execution of the computer program.

12. The computer program of claim 8 further comprising computer code that populates the cache during the mainstream execution of the computer program.

13. The computer program of claim 8 wherein the cache can be accessed by other programs.

14. The computer program of claim 8 wherein a copy of the data in the cache is stored in a storage medium separate from the cache.

15. A computer system comprising:
    a cache populated only with permissive resource access decisions obtained from a CORBA Resource Access Decision Facility; and
    computer code that retrieves a permissive access decision from the cache when the access decision is present in the cache and only requests an access decision from the CORBA Resource Access Decision Facility when the access decision is not present in the cache;
    wherein the computer code that retrieves an access decision from the cache when the access decision is present in the cache and only requests an access decision from the CORBA Resource Access Decision Facility when the access decision is not present in the cache comprises:

computer code that evaluates whether an access decision is a permissive access decision or whether the access decision comprises constraints or overrides;

computer code that retrieves a permissive access decision from the cache and requests a permissive access decision from the CORBA Resource Access Decision Facility when the permissive access decision is not present in the cache; and computer code that requests an access decision which comprises restraints or overrides from the CORBA Resource Access Decision Facility without first checking the cache.

16. The computer system of claim 15 further comprising computer code that retrieves from the cache, through the invocation of a single method, a list of roles that have access to a specified resource.

17. The computer system of claim 15 further comprising computer code that retrieves from the cache, through the invocation of a single method, a list of resources to which a specified role has access.

18. The computer system of claim 15 further comprising computer code that populates the cache prior to the mainstream execution of the computer program.

19. The computer system of claim 15 further comprising computer code that populates the cache during the mainstream execution of the computer program.

20. The computer system of claim 15 wherein the cache can be accessed by other programs.

21. The computer system of claim 15 wherein a copy of the data in the cache is stored in a storage medium separate from the cache.

* * * * *